United States Patent [19]

Nakase

[11] Patent Number: 5,445,338

[45] Date of Patent: Aug. 29, 1995

[54] TAPE DRIVER

[75] Inventor: Hideo Nakase, Saitama, Japan

[73] Assignee: Sony Corporation, Tokyo, Japan

[21] Appl. No.: 148,343

[22] Filed: Nov. 8, 1993

[30] Foreign Application Priority Data

Nov. 9, 1992 [JP] Japan .................. 4-298651

[51] Int. Cl.$^6$ ............................. G11B 15/30
[52] U.S. Cl. ..................... 242/349; 242/545; 192/84 PM
[58] Field of Search ............... 242/340, 342, 349, 356, 242/545, 545.1; 360/96.1, 96.3, 96.5; 192/84 PM; 464/29

[56] References Cited

U.S. PATENT DOCUMENTS

| 3,498,569 | 3/1970 | Kjos | 242/352.1 |
| 4,149,202 | 4/1979 | Terada et al. | 360/96.3 |
| 4,196,875 | 4/1980 | Tatekawa et al. | 242/356.3 X |
| 4,303,210 | 12/1981 | Fujita et al. | |
| 4,358,804 | 11/1982 | Uehara | 360/96.4 X |
| 4,630,149 | 12/1986 | Ida | 360/96.3 X |

Primary Examiner—John P. Darling
Attorney, Agent, or Firm—Jay H. Maioli

[57] ABSTRACT

A torque limiting device for a reel turntable can obtain a stable limiting torque even when an ambient temperature or speed is changed and also can prevent a tape from being damaged when a tape path is fluctuated. First and second magnets are disposed in such an opposing relation as to sandwich therebetween a magnetic plate of a limiting gear from both surfaces thereof and magnetic poles are magnetized on the opposing surfaces of the two magnets which repulse one another.

11 Claims, 3 Drawing Sheets

TAPE DRIVER

BACKGROUND OF THE INVENTION

1. Field of the Invention

The present invention relates to a torque limiting device of a reel turntable for use with a video tape recorder (VTR) or the like, for example.

2. Description of the Prior Art

Conventional reel turntable torque limiting mechanisms or devices employ a torque limiting device using a felt mat or a magnet.

FIG. 1 of the accompanying drawings is a cross-sectional view showing a reel turntable torque limiting mechanism using a magnet. A reel turntable mechanism that is generally designated by reference numeral 1 will be described initially. As shown in FIG. 1, the reel turntable mechanism 1 comprises a disk-shaped rotary member 3 integrally attached to an intermediate portion of a cylindrical-shaped rotary shaft 2 so as to extend outwardly, a cap portion 4 engaged into the upper portion of the rotary shaft 2 with a pressure, a reel turntable 5 that rotates in unison with the rotary shaft 2, a reel member 6 inserted into the upper end portion of the cap portion 4 so as to become freely slidable in the axial direction of the rotary shaft 2 and a coil spring 7 interposed between the reel member 6 and the reel turntable 5 for biasing the reel member 6 upwardly under spring force.

The reel turntable device 1 thus arranged is designed such that the rotary shaft 2 is inserted into a shaft 9 vertically erected from a chassis 8 to freely rotate. The reel turntable device 1 is rotated by a torque limiting device 10.

The torque limiting device 10 will be described below. The above-mentioned rotary member 3 has on its rear surface a disk-shaped yoke member 11 supported by an insert molding process. The yoke portion 11 has on its rear surface an annular-shaped magnet 12 made of, for example, ferrite attached. More specifically, the magnet 12 is engaged with a protruded portion 3a formed on the rotary member 3, for being prevented from being rotated relative to the rotary member 3. Also, the magnet 12 is fixed to the rotary member 3 by an adhesive, not shown.

A limiting gear 13 is rotatably supported at its shaft portion 13b to the rotary shaft 2 projected from the lower side of the rotary member 3. The limiting gear 13 has a magnetic plate 14 unitarily molded thereto by a so-called outsert molding process. The magnetic plate 14 is located near the above-mentioned magnet 12 to oppose the same, and the limiting gear 13 has on its outer peripheral portion a gear portion 13a. A spacing between the magnet 12 and the magnetic plate 14 is kept by a washer 15 made of a non-magnetic material interposed between the magnet 12 and the magnetic plate 14. The washer 15 is served also as a thrust block for the limiting gear 13.

The reel turntable device 1 is rotated by the torque limiting device 10 as follows.

When the limiting gear 13 is rotated by the drive gear (not shown), the magnet 12 generates a limiting torque in accordance with the rotation of the magnetic plate 14 because the magnetic plate 14 is magnetically attracted by the magnet 12 to thereby rotate the rotary member 3 about the shaft 9. Then, the reel turntable 5 is rotated in unison with the rotation of the rotary member 3. When the reel turntable 5 is overloaded by an excess tension applied to a cassette tape (not shown), the magnet 12 slips relative to the magnetic plate 14 so that the reel turntable 5 together with the rotary member 3 removes an excess tension applied to the tape.

The conventional torque limiting mechanism thus arranged generates a limiting torque by a magnetic attraction force generated between the magnet 12 and the magnetic plate 14. Simultaneously, a friction is generated among the magnetic plate 14, the magnet 12 and the washer 15 by a magnetic attraction force between the magnet 12 and the magnetic plate 14. The friction generated by the washer 15 is changed with the change of ambient temperature, the change of humidity or the change of speed of the limiting gear 13 or the like, thereby a limiting torque being fluctuated. As a consequence, such fluctuation of limiting torque exerts a bad influence upon the tape travel so that the tape is damaged.

OBJECTS AND SUMMARY OF THE INVENTION

Therefore, it is an object of the present invention to provide an improved torque limiting device for a reel turntable in which the aforesaid shortcomings and disadvantages of the prior art can be eliminated.

More specifically, it is an object of the present invention to provide a torque limiting device for a reel turntable which can generate a limiting torque stably even when the environmental condition is changed or a speed of a limiting gear is changed.

It is another object of the present invention to provide a torque limiting device for a reel turntable in which a tape that is damaged by the fluctuation of a tape path can be removed.

According to a first aspect of the present invention, there is provided a torque limiting device for a reel turntable that rotates a tape reel on which a tape is wound. This torque limiting device comprises a reel turntable being provided so as to become freely rotatable about a shaft, a limiting gear having a magnetic plate and a gear portion supplied with a drive force and being disposed so as to become freely rotatable about the shaft, a first magnet being provided as one body with the reel turntable so as to become freely rotatable about the shaft and opposing an upper surface of the magnetic plate, and a second magnet being provided as one body with the reel turntable so as to become freely rotatable about the shaft and opposing a lower surface of the magnetic plate, wherein a drive force transmitted to the gear portion transmits its drive force to the reel turntable by a magnetic coupling generated between the magnetic plate and the pair of first and second magnets opposing the upper and lower surfaces of the magnetic plate.

According to a second aspect of the present invention, there is provided a torque limiting device for a reel turntable that rotates a tape reel on which a tape is wound. This torque limiting device comprises a reel turntable being provided so as to become freely rotatable about a shaft, a limiting gear having a magnetic plate and a gear portion supplied with a drive force and being disposed so as to become freely rotatable about the shaft, a first magnet being provided as one body with the reel turntable so as to become freely rotatable about the shaft and opposing an upper surface of the magnetic plate, and a second magnet being provided as one body with the reel turntable so as to become freely rotatable about the shaft and opposing a lower surface of the magnetic plate, yoke plates being provided on the first and second magnets at their surfaces which are not opposed to the magnetic plate, a supporting member being provided as one body with the reel turntable so as to become rotatable about the shaft and having the second magnet and the yoke plate supported thereon, the reel turntable, the supporting member and the limiting gear being slidably engaged with one another on a sliding surface parallel to the magnetic plate and the opposing surfaces of the first and second magnets, and a washer being disposed on the sliding surface, wherein a drive force transmitted to the gear portion transmits its drive force to the reel turntable by a magnetic coupling generated between the magnetic plate and the pair of first and second magnets opposing the upper and lower surfaces of the magnetic plate.

In accordance with a third aspect of the present invention, there is provided a torque limiting device for a reel turntable that rotates a tape reel on which a tape is wound. This torque limiting device comprises a reel turntable being provided so as to become freely rotatable about a shaft, a limiting gear having a magnetic plate and a gear portion supplied with a drive force and being disposed so as to become freely rotatable about the shaft, a first magnet being provided as one body with the reel turntable so as to become freely rotatable about the shaft and opposing an upper surface of the magnetic plate, and a second magnet being provided as one body with the reel turntable so as to become freely rotatable about the shaft and opposing a lower surface of the magnetic plate, wherein a drive force transmitted to the gear portion transmits its drive force to the reel turntable by a magnetic coupling generated between the magnetic plate and the pair of first and second magnets opposing the upper and lower surfaces of the magnetic plate, the pair of first and second magnets are disposed with polarities which repulse each other, and a spacing between the second magnet and the magnetic plate is set to be smaller than that formed between the first magnet and the magnetic plate.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

A reel turntable torque limiting device according to an embodiment of the present invention will hereinafter be described with reference to the drawings.

Figure 1:
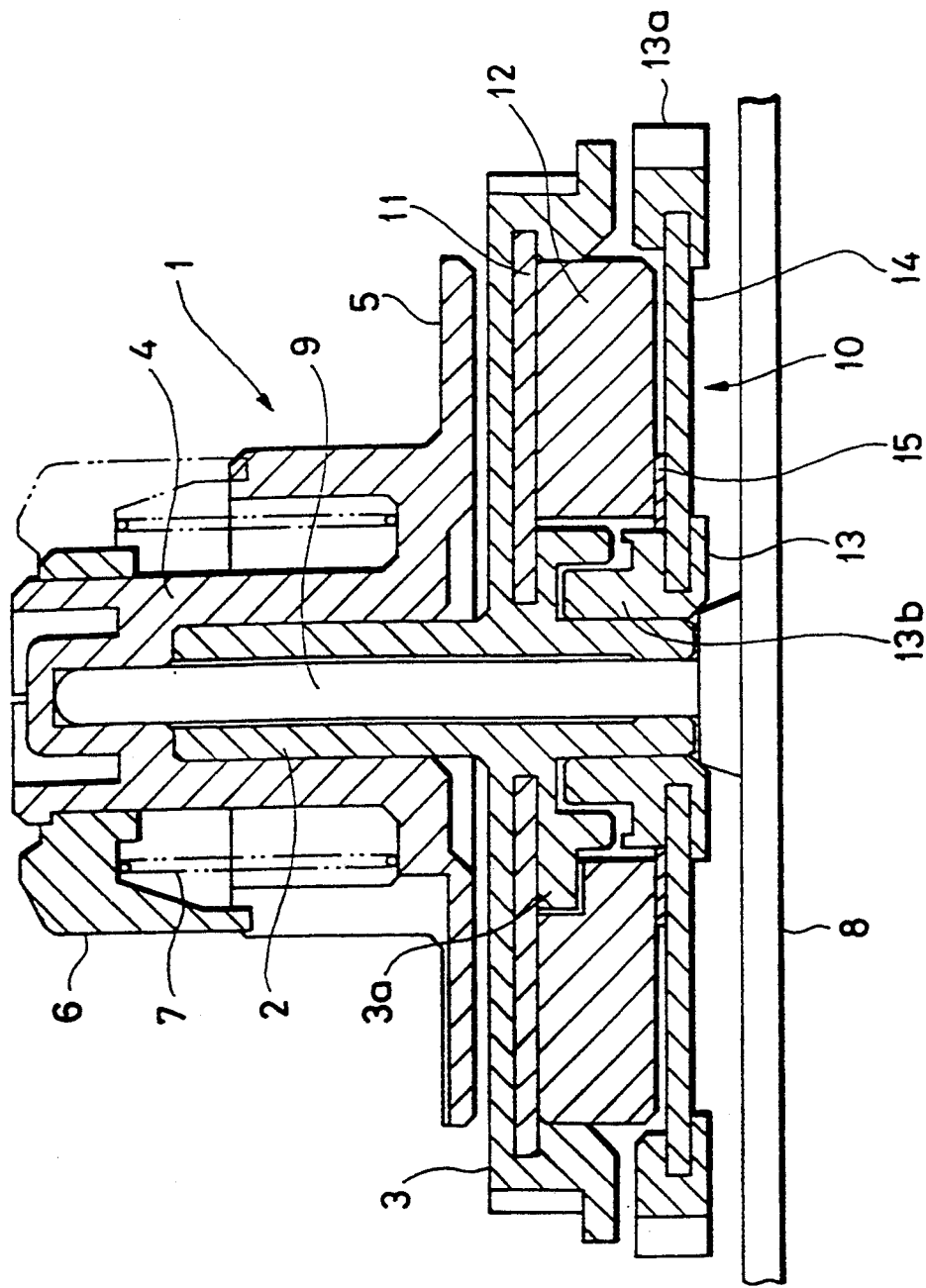
FIG. 1 is a cross-sectional view of a conventional reel turntable having a torque limiting device.
Figure 2:
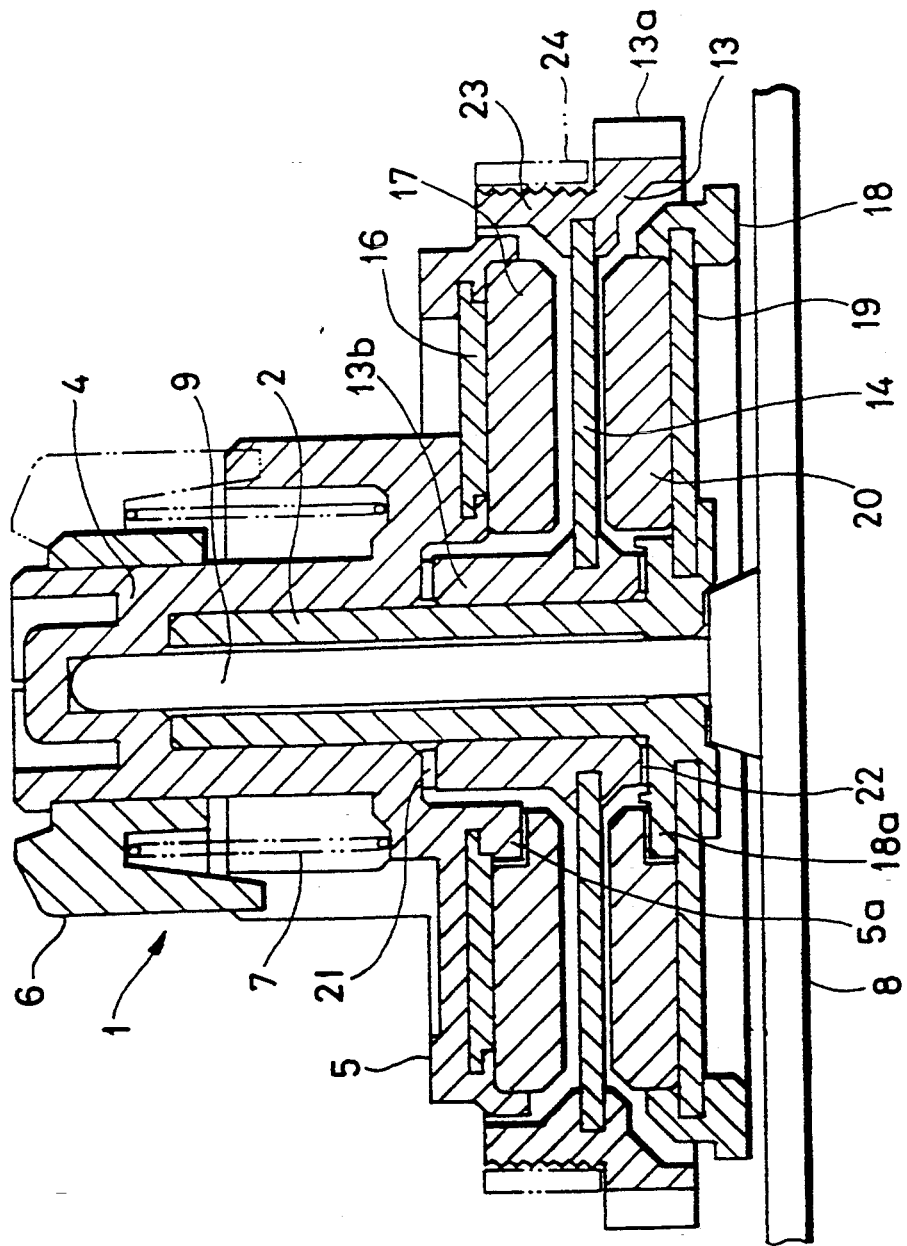
FIG. 2 is a cross-sectional view of a reel turntable having a torque limiting device according to an embodiment of the present invention.

FIG. 2 is a cross-sectional view of a reel turntable device and a torque limiting device, wherein like parts corresponding to those of FIG. 1 are marked with the same references and therefore need not be described in detail.

The torque limiting device 10 that is a main portion of the present invention will be described hereinafter. The limiting gear 13 is rotatably attached at its shaft portion 13b to the rotary shaft 2, and the disk-shaped magnetic plate 14 is molded on the limiting gear 13 in the outsert molding process, similarly to FIG. 1.

The reel turntable 5 that is rotated in unison with the rotary shaft 2 includes on its rear surface attached an annular first magnet 17 made of ferrite through a first yoke plate 16 molded by the outsert molding process in an opposing relation to the upper surface of the above-mentioned magnetic plate 14. The first magnet 17 is in engagement with the protruded portion 5a formed on the reel turntable 5, for being prevented from rotating thereby.

On the other hand, the rotary shaft 2 includes at its lower end portion a rotary member 18 of a flange configuration extended to the outside. The rotary member 18 includes an annular second magnet 20 made of ferrite attached through a second yoke plate 19 molded by the outsert molding process in an opposing relation to the lower surface of the above-mentioned magnetic plate 14. The second magnet 20 is in engagement with a protruded portion 18a of the rotary member 18, for being prevented from rotating thereby. Therefore, the first and second magnets 17, 20 are opposed to each other so as to sandwich the magnetic plate 14 with predetermined spacings therebetween in the upper and lower direction and rotated in unison with the reel turntable 5.

The spacing between the first magnet 17 and the magnetic plate 14 is kept by a washer 21 interposed between the bottom portion of the cap portion 4 of the reel turntable 5 and the upper bearing end portion of the limiting gear 13. The spacing between the second magnet 20 and the magnetic plate 14 is kept by a washer 22 interposed between the rotary member 18 and the lower bearing end portion of the limiting gear 13. In this embodiment, the spacing between the first magnet 17 and the magnetic plate 14 is set to be greater than that formed between the second magnet 20 and the magnetic plate 14.

A rotation torque of the limiting gear 13 can be controlled by adjusting a brake belt 24 wound around a drum surface 23 that is formed on the outer peripheral surface of the limiting gear 13.

Figure 3:
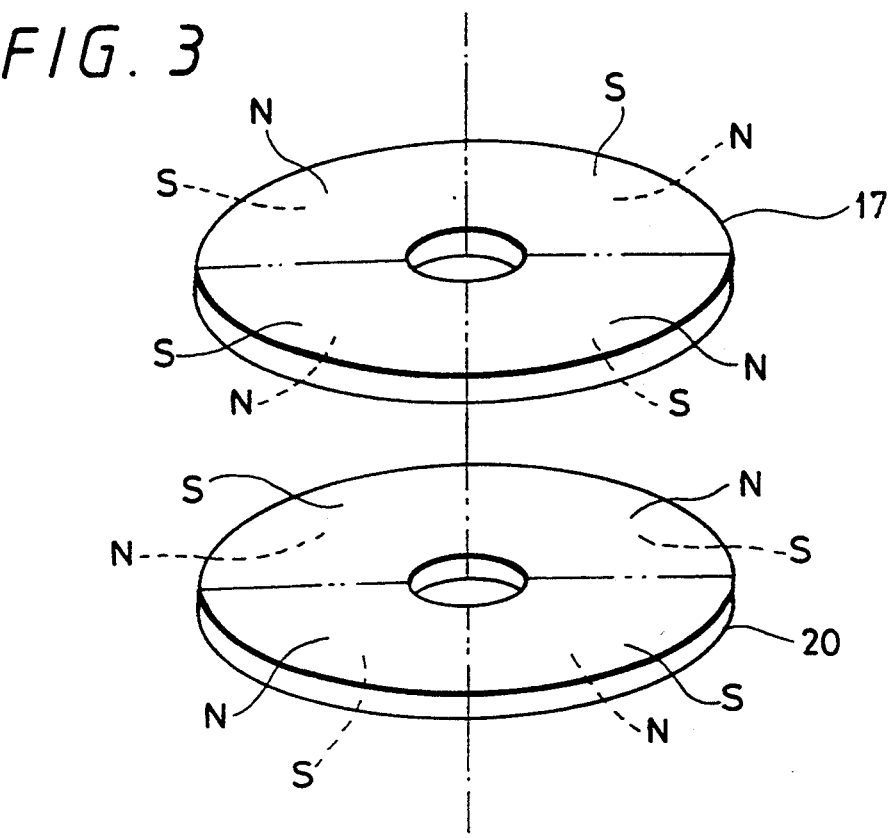
FIG. 3 is a perspective view showing the magnetized states of magnets.
Figure 4:
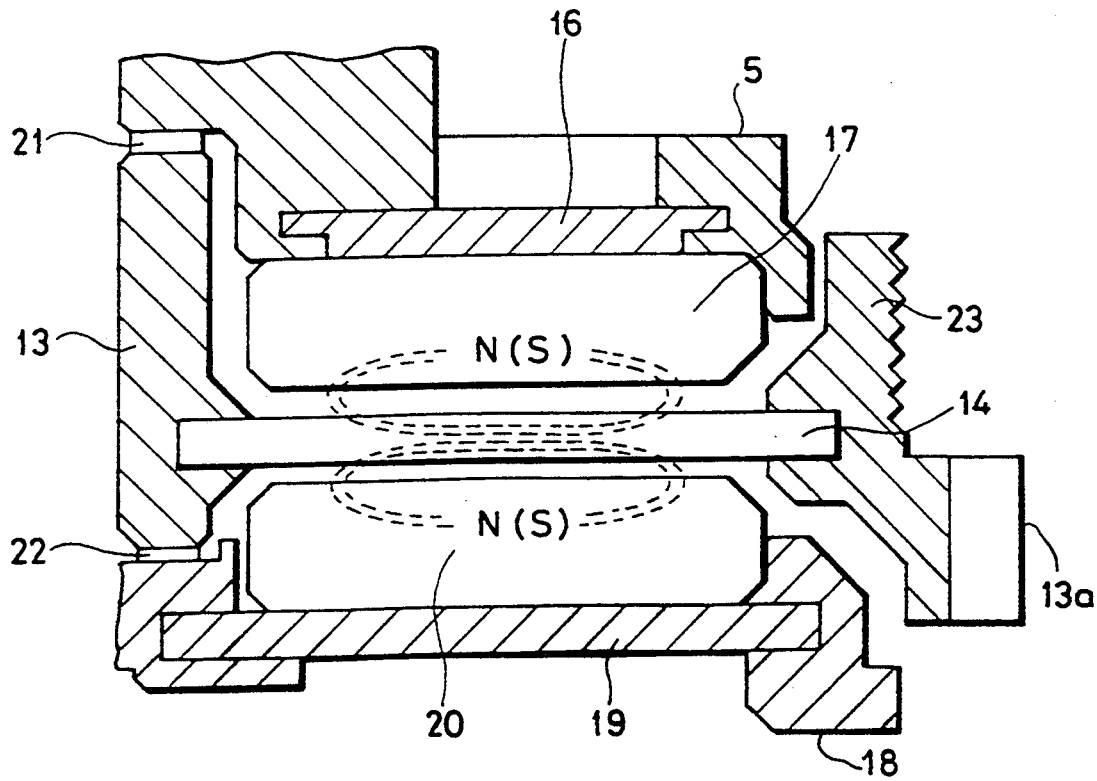
FIG. 4 is a diagram showing distribution of line of magnetic forces generated from the magnets to a magnetic plate.

Structures of the first and second magnets 17, 20 will be described more fully. As shown in FIG. 3, magnetic poles of a plurality of N poles and S poles, e,g, four magnetic poles in this embodiment are alternately magnetized on the first and second magnets 17, 20. The first and second magnets 17, 20 are disposed such that their opposing surfaces repulse each other. The thicknesses of the two magnets 17, 20 are selected to be substantially the half of that of the magnet 12 shown in FIG. 1. Thus, the torque limiting device of the present invention occupies substantially the same space as that of the conventional torque limiting device and therefore can be made compact in size.

Although the first and second magnets 17, 20 thus arranged repulse each other as described above, as shown in FIG. 3, lines of magnetic force generated from the first magnet 17 can provide a magnetic attraction force based on a magnetic force flowing on the upper half portion of the magnetic plate 14. Also, lines of magnetic force generated from the second magnet 20 can provide a magnetic attraction force based on a magnetic force flowing on the lower half portion of the magnetic plate 14.

Operation of the above-mentioned torque limiting device according to the present invention will be described next. When the limiting gear 13 is rotated by a drive gear (not shown), a limiting torque is generated in the first and second magnets 17, 20 in accordance with the rotation of the magnetic plate 14 because the first and second magnets 17, 20 generate a magnetic attraction force on the upper and lower surfaces of the magnetic plate 14 that is rotated in unison with the limiting gear 13. Thus, a transmission force acts such that the first magnet 17 directly rotates the reel turntable 5 and that the second magnet 20 rotates the reel turntable 5 through the rotary shaft 2.

When the reel turntable 5 that is rotated as described above is overloaded by an excess tension applied to the cassette tape (not shown), the first and second magnets 17, 20 slip relative to the magnetic plate 14 and hence the reel turntable 5 is operated to remove the excess tape tension.

As described above, according to the torque limiting device of the present invention, since the first and second magnets 17, 20 are opposed to each other so as to sandwich the magnetic plate 14 of the limiting gear 13 and the first and second magnets 17, 20 are magnetized so as to repulse each other, the first and second magnets 17, 20 repulse each other magnetically although the magnets 17, 20 generate the magnetic attraction forces to the magnetic plate 14. Consequently, the magnets 17, 20 are prevented from generating a friction force to the magnetic plate 14. Therefore, the torque limiting device according to the present invention can constantly and stably obtain a limiting torque even when an ambient temperature, a humidity or speed is changed.

Further, since the first and second magnets 17, 20 magnetically repulse each other so that they can be closely contacted with the yoke plates 16, 19, the magnets 17, 20 need not be fixed to the yoke plates 16, 19 by using an adhesive like the prior art but it is sufficient that the first and second magnets 17, 20 may be prevented from being rotated by the protruded portions 5a, 18a. If an adhesive is required, then the first and second magnets 17, 20 are temporarily bonded to the yoke plates 16, 19 when the torque limiting device is assembled.

Since the two magnets 17, 20 are not disposed with an equal spacing relative to the magnetic plate 14 of the limiting gear 13 but one magnet, e.g., the second magnet 20 in this embodiment, is disposed nearer the magnetic plate 14 of the limiting gear 13, magnetic influence of the second magnet 20 relative to the magnetic plate 14 can be strengthened and transmission of limiting torque can be carried out reliably.

While the magnets 17, 20 used in the torque limiting device according to the present invention are made of ferrite and have four magnetic poles as described above, the present invention is not limited thereto and the following variant is also possible. That is, if the magnets 17, 20 are made of ferrite, then the magnets 17, 20 have six to eight magnetic poles magnetized thereon. If the magnets 17, 20 are made of materials other than the ferrite, for example, samarium cobalt, then the magnets 17, 20 have ten magnetic poles magnetized thereon. In both cases, efficiency of limiting torque can be enhanced. In particular, when the magnets 17, 20 are made of samarium cobalt, the magnets 17, 20 can be reduced in thickness and the torque limiting device of the present invention can be miniaturized.

As described above, according to the present invention, there is provided the reel turntable torque limiting device in which the magnets are attached through the yoke plates to the rotary body that rotates in unison with the reel turntable and the limiting gear having the magnetic plate for transmitting torque to the reel turntable is disposed in an opposing relation to the magnets. In this reel turntable torque limiting device, the two magnets are disposed in such an opposing relation as to sandwich the magnetic plate of the limiting gear from both surfaces thereof. Therefore, even when the ambient temperature, the humidity or the speed is changed, a stable limiting torque can be obtained constantly. As a consequence, the tape can be transported under the condition that the tape path is not changed and that the tape can be prevented from being damaged.

Furthermore, since the magnetic plate is sandwiched by the magnets from both surfaces thereof, a high limiting torque can be obtained as compared with the conventional torque limiting device in which only one magnet is used.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A torque limiting device for a reel turntable that rotates a tape reel on which a tape is wound, comprising:

a reel turntable being provided so as to be freely rotatable about a shaft;

a limiting gear having a magnetic plate and a gear portion supplied with a drive force and being disposed so as to be freely rotatable about said shaft;

a first magnet attached to said reel turntable so as to be freely rotatable about said shaft and opposing an upper surface of said magnetic plate; and a second magnet disposed about said shaft so as to be freely rotatable about said shaft in unison with said reel turntable and opposing a lower surface of said magnetic plate, wherein a drive force transmitted to said gear portion is transmitted to said reel turntable by a magnetic coupling between said magnetic plate and said pair of first and second magnets opposing the upper and lower surfaces of said magnetic plate.

2. The torque limiting device for a reel turntable according to claim 1, wherein first and second yoke plates are respectively attached to said first and second magnets at surfaces which do not oppose said magnetic plate.

3. A torque limiting device for a reel turntable according to claim 2, further comprising a supporting member disposed about said shaft for supporting said second magnet and said second yoke plate thereof, wherein said first magnet and said first yoke plate thereof are supported by said reel turntable and said supporting member is connected to said reel turntable so as to be freely rotatable about said shaft.

4. The torque limiting device for a reel turntable according to claim 3, wherein said reel turntable, said supporting member and said limiting gear are in slidable engagement on a sliding surface parallel to said magnetic plate and said opposing surfaces of said first and second magnets.

5. The torque limiting device for a reel turntable according to claim 4, further comprising a washer disposed upon said sliding surface.

6. The torque limiting device for a reel turntable according to claim 1, wherein said pair of first and second magnets are disposed with polarities which repulse each other.

7. The torque limiting device for a reel turntable according to claim 6, wherein a spacing between said second magnet and said magnetic plate is set to be substantially smaller than a spacing between said first magnet and said magnetic plate.

8. The torque limiting device for a reel turntable according to claim 7, wherein each of said first and second magnets comprises samarium cobalt.

9. The torque limiting device for reel turntable according to claim 1, further comprising braking means which is engaged with an outer periphery of said limiting gear in order to control a rotational torque of said limiting gear.

10. A torque limiting device for a reel turntable that rotates a tape reel on which a tape is wound, comprising:

a reel turntable freely rotatable about a shaft;

a limiting gear having a magnetic plate and a gear portion supplied with a drive force and being disposed so as to be freely rotatable about said shaft;

a first magnet attached to said reel turntable so as to be freely rotatable about said shaft and opposing an upper surface of said magnetic plate; and a second magnet disposed about said shaft so as to be freely rotatable about said shaft in unison with said reel turntable and opposing a lower surface of said magnetic plate, wherein a drive force transmitted to said gear portion is transmitted to said reel turntable by a magnetic coupling generated between said magnetic plate and said pair of first and second magnets opposing the upper and lower surfaces of said magnetic plate, said pair of first and second magnets are disposed with polarities which repulse each other, and a spacing between said second magnet and said magnetic plate is set to be substantially smaller than a spacing between said first magnet and said magnetic plate.

11. A torque limiting device for a reel turntable that rotates a tape reel on which a tape is wound, comprising:

a reel turntable being provided so as to be freely rotatable about a shaft;

a limiting gear having a magnetic plate and a gear portion supplied with a drive force and being disposed so as to be freely rotatable about said shaft;

a first magnet attached to said reel turntable so as to be freely rotatable about said shaft and opposing an upper surface of said magnetic plate;

a second magnet disposed about said shaft so as to be freely rotatable about said shaft in unison with said reel turntable and opposing a lower surface of said magnetic plate;

first and second yoke plates being provided respectively on said first and second magnets at surfaces which are not opposed to said magnetic plate;

a supporting member connected to said reel turntable so as to be rotatable about said shaft and having said second magnet and said second yoke plate supported thereon, said reel turntable, said supporting member and said limiting gear being slidably engaged on a sliding surface parallel to said magnetic plate and said opposing surfaces of said first and second magnets; and a washer disposed on said sliding surface, wherein a drive force transmitted to said gear portion is transmitted to said reel turntable by a magnetic coupling between said magnetic plate and said pair of first and second magnets opposing the upper and lower surfaces of said magnetic plate.

* * * * *